United States Patent
Klay et al.

(10) Patent No.: US 6,597,659 B1
(45) Date of Patent: Jul. 22, 2003

(54) METHOD OF AND APPARATUS FOR CONFORMING DATA CELL TRANSMISSION RATE BETWEEN SOURCE AND DESTINATION TERMINALS

(75) Inventors: Francis Klay, Lannion (FR); Christophe Rabadan, Ploubezre (FR)

(73) Assignee: France Telecom SA, Paris (FR)

( * ) Notice: Subject to any disclaimer, the term of this patent is extended or adjusted under 35 U.S.C. 154(b) by 0 days.

(21) Appl. No.: 09/423,729

(22) PCT Filed: Mar. 4, 1999

(86) PCT No.: PCT/FR99/00495

§ 371 (c)(1),
(2), (4) Date: Feb. 7, 2000

(87) PCT Pub. No.: WO99/46901

PCT Pub. Date: Sep. 16, 1999

(30) Foreign Application Priority Data

Mar. 12, 1998 (FR) .............................. 98 03274

(51) Int. Cl.[7] .............................. H04J 1/16; H04J 3/14
(52) U.S. Cl. .................... 370/229; 370/236.1
(58) Field of Search ................... 370/230, 229, 370/236.1, 231–235, 236, 395.1, 395.4–395.43, 468

(56) References Cited

U.S. PATENT DOCUMENTS

| | | | | | |
|---|---|---|---|---|---|
| 5,974,033 A | * | 10/1999 | Kamiya | ...................... | 370/323 |
| 6,061,330 A | * | 5/2000 | Johansson | .................... | 370/229 |
| 6,192,033 B1 | * | 2/2001 | Benson | ...................... | 370/236 |
| 6,359,862 B1 | * | 3/2002 | Jeffries | ........................ | 370/232 |

FOREIGN PATENT DOCUMENTS

GB 2 301 977 A 12/1996

\* cited by examiner

*Primary Examiner*—Ajit Patel
*Assistant Examiner*—Chirag Shah
(74) *Attorney, Agent, or Firm*—Lowe Hauptman Gilman & Berner, LLP

(57) ABSTRACT

The present invention concerns a method of controlling the conformity of the transmission rate of data cells transmitted by a source terminal in communication with a destination terminal.

It consists essentially, when a backward-resource management cell (BW-RM) of order k arrives at the said interface unit (21), of determining the programming time ($t_p(k)$) of the taking into account, by the said control process (21b), of the rate request (ER(k)) contained in the field of the said cell (BW-RM).

It also concerns a user-network interface unit which has means for being able to implement the steps of the said methods.

18 Claims, 7 Drawing Sheets

METHOD OF AND APPARATUS FOR CONFORMING DATA CELL TRANSMISSION RATE BETWEEN SOURCE AND DESTINATION TERMINALS

FIELD OF INVENTION

Method of controlling the conformity of the transmission rate of data cells transmitted by a source terminal in communication with a destination termninal and a user-network interface unit provided for implementing the said method.

BACKGROUND ART

The present invention concerns a method of controlling the conformity of a flow of cells transmitted by a source application of a high-speed network, for example a network using the so-called ATM (Asynchronous Transfer Mode) transfer mode. More precisely, the invention is applied to sources whose transfer mode is an available resource sharing mode, also referred to in the art as ABR (Available Bits Rate) mode.

For whatever useful purpose it may serve, it is to be stated that the ATM transfer mode consists of conveying, in a data network, packets of information of fixed size referred to as cells. A source terminal thus sends data cells in the network, which conveys them to a destination terminal in accordance with a preestablished communication protocol. These cells are thus directed and oriented through a preestablished channel between the two terminals. This channel, which is also referred to as a connection, is notably characterised by its transmission rate, which must be sufficient to convey all the information transmitted by the source. To do this, at each element through which the said channel passes, a transmission rate is reserved for this channel.

The major advantage of high-speed networks based on the asynchronous transfer mode, in addition to the access to transmission and switching capacities which can support high transmission rates, is to be able to integrate, on the same transmission medium, applications whose requirements in terms of quality of service and resources are different. These ATM networks also allow the use of applications which transmit cells with rates which are variable over time, such as applications of the video type or Internet type, which gives rise to a variation over time of the consumption of the network resources used by these applications. In order to integrate all these applications, the ATM technique must satisfy the following three criteria: i) offer the necessary transmission rate to any application connected, ii) guarantee the quality of service level required by any application connected, iii) optimise the use of the resources available in the network.

The first two points make it possible to establish the requirements of a given application, which, after having been negotiated and accepted by the network during the call procedure, constitute what is referred to as the traffic contract between the user, who is the user of the envisaged application, and the network. This contract, which is defined by the two interfaces referred to in the art as UNI (User Network Interface), between the network and each of the two applications, defines the traffic characteristics of the source application and the quality of service QoS required for its correct operation. This contract guarantees to the source application the quality of service QoS demanded if the latter complies with the traffic characteristics which it negotiated at the time of the call.

The present application applies mainly to the so-called available resource sharing transfer mode or ABR (Available Bit Rate) mode. This ATM transfer mode is generally intended for applications capable of adapting their cell transmission rates during connection. Amongst these applications, there will for example be data transfer applications: interconnection or emulation of local networks of the so-called LAN (Local Area Network) type, or access to remote data.

This transfer mode, whose control mechanisms are implemented at the ATM layer of the network, was notably developed for the purpose of more effectively using the available passband in an ATM network while guaranteeing a transmission rate and a quality of service QoS level sufficient for the correct operation of the applications connected.

This ABR mode is first of all a communication protocol which, for a connection established between a source terminal and a destination terminal, makes it possible to share with other connections the resources available in each of the elements of the network through which the said connection passes. These available resources correspond to the sum of the transmission rates which is not used by any of the connections on the element under consideration. To effect this sharing, the transmission rate of each of the sources which are also operating in this ABR mode is regulated as a function on the one hand of the quantity of resources available in each network element and on the other hand the sharing which is performed thereof between the connections also operating according to the ABR mode. The ABR mode therefore involves a mechanism of controlling the transmission rate only of the sources which are operating in ABR mode according to the transmission rate allocated by the network elements for each connection operating in this mode. This control mechanism makes it possible to dynamically adjust the transmission rate of the sources according to the resources available in the network.

This mechanism is as follows. Each source periodically transmits a forward resource management cell, also referred to in the art as FW-RM or "Forward-Resource Management", and is returned by the destination application in the form of a backward resource management cell, also referred to as BW-RM or "Backward-RM". Each network element through which one or other cell passes has the possibility of explicitly indicating its congestion state to it by loading an appropriate word into one of the fields. This state is in the form of a rate hereinafter denoted ER, or Explicit Rate. After this forward and backward transmission, the B-RM cell carries congestion directives which enable the source to adapt the value of its rate, for example between a minimum value MCR and a maximum value PCR (respectively Minimum Cell Rate and Peak Cell Rate) negotiated in the traffic contract.

Thus the actual transmission rate of each source is controlled in order to make sure that they do not exceed the rate reserved for it in the network. This is because, if a malevolent source transmits at a rate greater than that allocated to it or authorised, it may saturate the capacity of the network elements. It thus jeopardizes the transfer of information and therefore the quality of service of all the other connections passing through the same network elements.

This control is referred to as a conformity control and is implemented at the interface between the network and a source, either at the UNI (User-Network Interface) by means of a so-called UPC (Usage Parameter Control) operator, or at the NNI (Network-Network Interface) by means of a so-called NPC (Network Parameter Control) operator. It is implemented by means of a conformity control algorithm which is generally referred to as a GCRA or Generic Cell Rate Algorithm. Applied to the ABR transfer mode for which, as has just been seen, the rate reserved changes all along the connection as a function of the resources available in the network elements, it is referred to as a DGCRA, or Dynamic Generic Cell Rate Algorithm.

In FIG. 1, a first terminal 10 can be seen, referred to as the source terminal, connected to a network 20. A second terminal 30, referred to as the destination terminal, is also connected to the network 20. In the remainder of this description, it will be assumed that the terminals 10 and 30 are in communication with each other. In addition, they are both of the type operating in ABR mode with resource sharing. A virtual channel is therefore established between them to allow the transmission of data cells sent by the source terminal 10. User-network interface units 21 (referred to as UNI in the art) are provided between the network 20 and the terminals 10, 30. It is in these units 21 that the functions of the UPC operators are implemented, as well as the DGCRA algorithm which is now described in relation to FIG. 1.

It should be noted that the network 20 can consist of a number of networks interconnected by means of network-network interface units (not shown) which are referred to, in the art, as NNIs, which implement the functions of the NPC operators as well as the DGCRA algorithm.

Although each user terminal can be both transmitter and receiver of data cells, a source terminal 10 which sends data cells to a destination terminal 30 will be considered for simplification. The data cells, transmitted from the source terminal 10, are controlled at the user-network interface (UNI) 21 between the source 10 and the network 20 or at the network-network interface (NNI) between two different domains, if such is the case.

Thus, for implementing this algorithm, the source terminal 10 periodically sends a forward-resource management cell (FW-RM) to the terminal 30, which returns a backward-resource management cell BW-RM to the terminal 10. It sends for example a resource management cell every 32 data cells. The congestion information concerning the elements through which the connection passes are fed back via the BW-RM cells which thus inform the unit 21 on the source terminal side of the new maximum rate allocated by the network elements. The source terminal 10 is, on reception of the resource management cell B-RM, informed of this new rate. Generally it applies the new rate only as from the next cells generated, which then reach the interface unit 21 only after a delay corresponding to the propagation time of the cells between the source terminal and the interface unit 21.

It will be understood that it is not possible to apply, in the function of controlling the flow of data cells sent by the terminal 10, a change in rate as from the resending of the backward-resource management cell BW-RM by the interface unit 21. This is because it is necessary to wait for, on the one hand, the time required for the source terminal 10 to take cognizance of the new rate, a time corresponding to the propagation time between the interface unit 21 and the source terminal 10, and, on the other hand, the time required for the data cells sent by the terminal 10 in compliance with this new rate to arrive at the interface unit 21, a time which then corresponds to the propagation time $t_1$ between the source terminal 10 and the interface unit 21. The total waiting time therefore corresponds to a forward and backward propagation time $t_2$, also referred to as the Round Trip Time (RTT), between the interface unit and the source terminal 10.

These propagation times in the network upstream of the interface vary according to the loading of the source terminal 10 and the access network. Nevertheless, the variation in propagation time $t_1$ between the source terminal 10 and the interface unit 21 can be bounded upwardly by the variation in cell delay CDV (Cell Delay Variation) (also denoted $\tau_1$) tolerated at the interface unit 21 which is fixed for the range of rates between the minimum rate MCR and the maximum rate PCR.

As for the forward and backward propagation time $t_2$, this lies between the maximum $\tau_2$ and minimum $\tau_3$ forward and backward delays. Thus a change in rate will be effective at the interface unit 21 in a time interval between $[\tau_3, \tau_2]$ after the departure of the corresponding resource management cell BW-RM from the interface unit 21.

Various DGCRA conformity algorithms have been proposed. The first was the DGCRA algorithm referred to as A described in the ATM forum by Berger & al.

At the arrival at the time denoted $t_a(i)$ of a data cell of order i sent by the source terminal 10, the DGCRA algorithm A will determine, in accordance with a first programming process represented by a box 21a in FIG. 1a, the control rate which it will apply in a second control process represented by a box 21b in FIG. 1a.

For this programming process, the DGCRA conformity algorithm A, for each data cell of order i arriving at the interface unit 21, at time $t_a(i)$, implements a function of seeking the rate of maximum value in a list of rate requests. Each rate request in this list corresponds to a request carried by a backward-management cell BW-RM which arrived previously at the interface unit 21. This BW-RM cell started from the interface unit 21 at a previous time which is situated in a time interval between the current time decreased by the maximum forward-backward delay $\tau_2$ and the current time decreased by the mini mum forward-backward delay $\tau_3$.

As for the control process 21b, this applies the control rate $ACR(t_a(i))$ to the cell i which arrives at the interface unit 21 at the time $t_a(i)$ defined by:

$$ACR(t_a(i))=MAX(ER(i_{max}), ER(j))$$

where $ER(i_{max})$ corresponds to the rate carried by the BW-RM cell of order $i_{max}$ which started from the interface unit 21 at the time $tb(i_{max})$ preceding the time $(t_a(i)-\tau_2)$ and $ER(j)$ represents all the rate values carried by the B-RM cells which started from the interface at the times $tb(j)$ such that $t_a(i)-\tau_2<tb(j)<t_a(i)-\tau_3$.

While there can be only a single change in rate for each BW-RM cell and a resource management cell RM is sent only once every 32 data cells, the DGCRA algorithm described above recalculates, at each arrival of a data cell, the rate to be applied to the conformity control process.

It determines the rate to be controlled at a given time by seeking in a list the rate change requests which occurred in the past. As it does not program in the future the times of rate changes, it does not a priori know when the application of a particular rate to the cell flow conformity control will begin and end. Because of this, the algorithm A recalculates a rate to be controlled at each new arrival of a data cell at the interface unit at the times $t_a(k)$. However, a change in rate is determined solely by the departure from the interface unit of a backward-resource management cell B-RM, whose frequency is much lower than that of the data cells (by default, one RM cell for 32 data cells). The determination of the value of the rate to be controlled for each arrival of a data cell greatly complicates the implementation of such a process.

In addition, the algorithm A uses a non-bounded list of events which correspond to the rate change instructions which took place during the maximum RTT propagation delay $\tau_2$. During an implementation of this algorithm, it will be necessary to physically limit the size of the memory necessary for storing the rate request information (ER(j),$t_b$(j)). As this algorithm does not define any rules for reducing the number of relevant information items stored, it is not robust against any overflows of the said memory. When the number of rate changes which occurred over a period $\tau_2$ exceeds the storage capacity of the memory, certain rate changes may be lost and thus cause a faulty conformity control. For example, if a rate request corresponding to a rate increase is lost, the conformity control may then be made to a low level of rate inopportunely causing the destruction of data cells transmitted at a higher rate than this level but in accordance with the rate increase instruction.

In order to solve this problem, algorithms with two memories have been designed. These algorithms manage a list of rates to be programmed in the future. This list is limited to two rate change requests.

The major drawback of these algorithms concerns their low capacity to record the rate change requests which occurred in a given time interval. When more than two change requests occur in a time interval $\tau_2$, the algorithms with two memories effect a selection of the rates to be programmed. This selection produces a deletion of certain rates which causes an over-evaluation of the controlled rate. This over-evaluation can be frequent when the propagation times between the source and the interface unit are large compared with the time between two resource management cells RM. This is the case when the control function is a long way from the source, which is the case in NPC (Network Parameter Control) functions. In addition, the over-evaluation can be great when the resources available in the network vary greatly from one resource management cell RM to the next. Consequently the conformity control can be made to a rate level higher than that actually authorised by the network.

The aim of the invention is to propose a method of controlling the conformity of a flow of data cells transmitted by a source operating in an available resource sharing mode ABR which can be implemented more simply than for the algorithm A and whose behaviour is closest to the reference behaviour given by this algorithm A. The aim is therefore to provide such a method which makes it possible to control the transmission rate of the ABR sources much more strictly and precisely than the algorithms of the prior art, notably the algorithms with two memories. It is thus to afford better protection of the network against malevolent sources seeking to transmit at rates greater than those authorised.

SUMMARY OF THE INVENTION

To achieve these aims, a method of controlling the conformity of the transmission rate of the data cells transmitted by a source terminal in communication with a destination terminal according to the invention involves a programming process including, at the arrival of a backward-resource management cell at the said interface unit, of determining the time, referred to as the programming time ($t_p$(k)), of the taking into account, by the said control process, of the rate request contained in the field of the said cell, the said programming time being equal to the said arrival time ($t_b$(k)) delayed by the minimum forward-backward delay ($\tau_2$), ($t_b$(k)+$\tau_2$) being referred to as the furthest away programming time, if its taking into account at the said closest programming time ($t_b$(k)+$\tau_1$) had resulted in a reduction in transmission rate, and of transmitting, at the expiry of the programming time ($t_p$(k)), the said value of rate to be controlled (ACR($t_p$(k))) to the said control process for controlling the flow transmitted by the said source terminal.

Another feature of the invention includes keeping a list of programming events, each event being defined by a pair of values, the first of which represents a rate value ACR($t_p$(k)) and the second of which represents the programming time $t_p$(k) of the said rate value ACR($t_p$(k)), and the said list being ordered according to the said event programming time.

Another feature of the invention includes in order to know the programmed rate (ACR($t_p^-$(k))) at the arrival time $t_b$(k) delayed by the minimum forward-backward delay $\tau_3$($t_p^-$(k))= $t_b$(k)+$\tau_3$), defining a function ACR(l, t) which, from the events present in the list l, determines the value of the programmed rate at any time t in the following manner:

if, in the said list l, there exists at least one programming event {ACR($t_p$), $t_p$} provided at a programming time $t_p$ between the present time $t_0$ and the time t, the said value is equal to the programming rate of this event ACR($t_p$) and, if there are a number of them, it is equal to the programming rate of the last of these events, and if, still in this list, there are no programmed events between the present time $t_0$ and t, the said value is equal to the value of the rate controlled at present in the control process.

Another feature of the Invention includes:

at the arrival, at the interface unit (21) to which the said source terminal is connected, a backward-resource management cell (BW-RM) of reference number (k), and comparing the rate (ER(k)) carried by the said cell with the programmed rate (ACR(l,($t_p^-$(k)))) at the closest programming time, and then if the said comparison effected at each arrival of a resource management cell (BW-RM) indicates that the requested rate ER(k) is greater than the programmed rate at the closest programming time (ACR(l,($t_p^-$(k)))), deleting, from the said list l, any rate programming event provided at a time greater than or equal to the closest programming time ($t_p^-$(k)) and adding, to the list l, an event whose controlled rate is equal to the value of the rate ER(k) carried by the said cell and whose programming time is the closest programming time ($t_p^-$(k)=$t_b$(k)+$\tau_3$), if the said comparison indicates that the requested rate (ER(k) is equal to the programmed rate ACR(l, ($t_p^-$(k)) at the closest programming time, deleting, from the list l, any rate programming event whose programming time is greater than the closest programming time ($t_p^-$(k)=$t_b$(k)+$\tau_3$), if the said comparison indicates that the requested rate ER(k) is less than the programmed rate ACR(l, ($t_p^-$(k)) seeking, in the said list l, if it exists, an event whose programming time ($t'_p$) is the shortest programming time in the list greater than the closest time and whose rate is less than or equal to the requested rate ER(k), if this search indicates that this event does not exist, adding, to the list l, an event whose rate is equal to the value of the requested rate ER(k) and whose programming time is the furthest away programming time (tp$^+$(k)=$t_b$(k)+$\tau_2$) and, if this search indicates that this event exists, deleting, from the list l, any programming event whose programming time is greater than or equal to the programming time ($t'_p$) of the said event thus found and adding, to the list l, an event whose rate is equal to the value of the requested rate ER(k) and whose programming time is equal to the programming time of the said found event ($t'_p$).

and, changing the control rate of the control process (21b) with the rate of the first programmed event $\{ACR(1), t_p(1)\}$ in the list of programming events when the programming time $t_p(1)$ of the said first event expires.

Another feature of the invention includes limiting the number of events stored in the said list l to a finite number N of events equal to or greater than two, and, before adding a new event to the said list, making sure that the number of events contained in the said list is not greater than the said finite number and, in this case, then implementing a function of reducing the number of events contained in the list.

According to another feature of the invention, the said reduction function includes responding to the requested rate (ER(k)) carried by the backward-resource management cell (BW-RM) of order k which arrives at time (tb(k)) being equal to the programmed rate $(ACR(l, (t_p^-(k)))$ at the closest programming time $(t_p^-(k)=t_b(k)+\tau_3)$, by deleting, from the list l, any rate programming event whose programming time is greater than or equal to the closest programming time $(t_p^-(k)=t_b(k)+\tau_3)$ and adding to the list l an event whose rate is equal to the value of the rate (ER(k)) carried by the said backward-resource management cell (BW-RM) and whose programming time is the closest programming time $(t_p^-(k)=t_b(k)+\tau_3)$.

Another feature of the invention includes responding to an event for a time corresponding to the closest time $(t_p^-(k)=t_b(k)+\tau_3)$ being added to the list, by checking, before adding the said event, whether the number of events in the list l is equal to the said finite number N and whether the programming time of the last event in the list $(t_p(N))$ is less than or equal to the closest programming time $(t_p^-(k)=t_{pb}(k)+\tau_3)$, by defining the programming time of the event the be added $(t_p(k))$ as being equal to the said programming time of the last event in the list, deleting the last event from the list, and adding the said event to be added in place of the last event in the list l, and otherwise, if the number of events in the list is less than the said finite number X, of defining the programming time of the event to be added as being equal to the closest programming time $(t_p^-(k)=t_b(k)+\tau_3)$, and adding the said event to the list.

Another feature of the invention includes responding to an event for a time corresponding to the furthest away time being added to the list, by checking, before adding the said event, whether the number of events in the list l is equal to the said finite number N, and if such is the case, replacing the programming time $(t_p(k))$ of the event to be added with the programming time of the last event in the list $(t_{pl}(N))$ if the rate of the said event to be added (ER(k)) is greater than or equal to the last programmed rate in the list ER(N), programming, in place of the penultimate event in the list (of order N−1), an event whose programming time is that of the penultimate event in the list l $(ACR(N-1),(t_{pl}(N-1))$ and whose rate is the greater rate of the rates of the last two events in the list l $(ACR(N-1)=Max (ACR(N-1), ACR(N)))$, and then adding the event to be added in place of the last event in the list l.

Another feature of the invention includes responding to an event being added to the list l, by making sure that the number of events contained in the list l does not exceed the said finite number, and, if such is the case, of seeking in the list l two successive events for which the product of the increase or decrease in rate and the measurement of the time interval between their two programming times is a minimum and then substituting for them an event whose rate is the greater of the two rates and whose programming time is the first of the two programming times.

The present invention also concerns a user-network interface unit which has a processor for implementing, in whole or in part, the method of the invention as just described.

The characteristics and advantages of the invention mentioned above and of others will emerge more clearly from a reading of the following description of example embodiments, the said description being given in relation to the accompanying drawings.

According to another characteristic of the invention, it consists, when an event for a time corresponding to the furthest away time is added to the list, of checking, before adding the said event, whether the number of events in the list l is equal to the said finite number N, and, if such is the case, it consists of replacing the programming time $(t_p(k))$ of the event to be added with the programming time of the last event in the list $(t_{pl}(N))$ if the rate of the said event to be added (ER(k)) is greater than or equal to the last programmed rate in the list ER(N), programming, in place of the penultimate event in the list (of order N−1), an event whose programming time is that of the penultimate event in the list l $(ACR(N-1),(t_{pl}(N-1))$ and whose rate is the greater rate of the rates of the last two events in the list l $(ACR(N-1)=Max(ACR(N-1), ACR(N)))$, and then adding the event to be added in place of the last event in the list l.

According to another characteristic of the invention, it consists, when an event is added to the list l, of making sure that the number of events contained in the list l does not exceed the said finite number, and, if such is the case, of seeking in the list l two successive events for which the product of the increase or decrease in rate and the measurement of the time interval between their two programming times is a minimum and then substituting for them an event whose rate is the greater of the two rates and whose programming time is the first of the two programming times.

The present invention also concerns a user-network interface unit which has means for implementing, in whole or in part, the method of the invention as just described.

The characteristics and advantages of the invention mentioned above and of others will emerge more clearly from a reading of the following description of example embodiments, the said description being given in relation to the accompanying drawings amongst which:

DETAILED DESCRIPTION OF THE DRAWING

Figure 1:
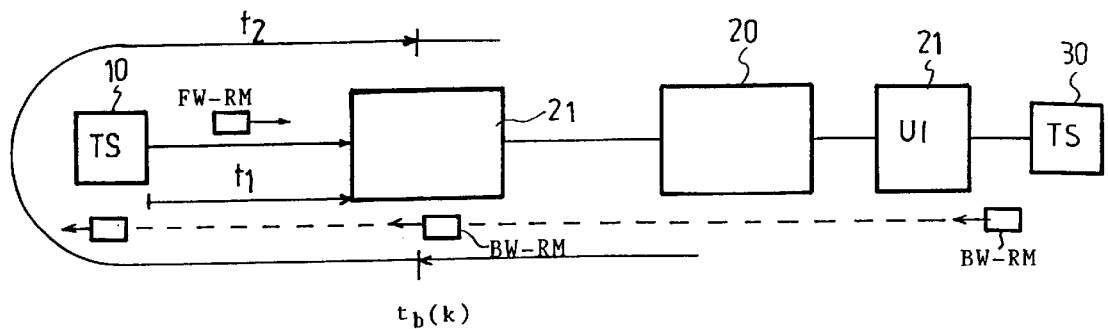
FIG. 1 is a diagram of a network to which the present invention applies.
Figure 1A:
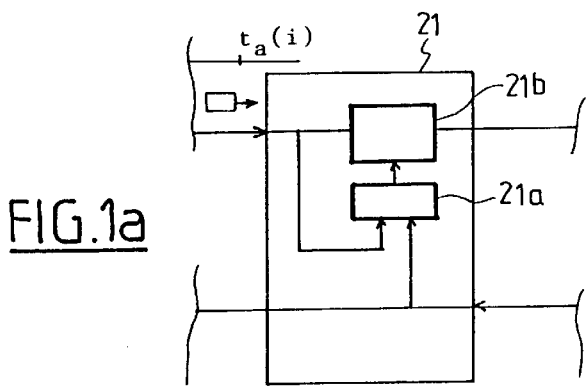
FIG. 1a is an explanatory diagram of the processes implemented in a user-network interface unit according to the prior art.

Like the methods according to the prior art, the conformity control method according to the invention includes performing, in a user-network interface unit 21, referred as a UNI in the art (see FIG. 1), or in a network-network interface unit, referred to as an NNI in the art (not shown), two processes 21a and 21b which are executed independently of each other. These two processes 21a and 21b as organized in the context of the present invention, are now described in relation to FIG. 1b.

The first process is a control process 21b proper which verifies that the data cell of order i is, on its arrival at the interface unit 21 at time $t_a(i)$, in accordance with the traffic parameters written $(ACR(t_a(i)),\tau_1)$, where $ACR(t_a(i))$ is the rate to be controlled at the time of arrival $t_a(i)$ of the data cell of order i and $\tau_1$ the associated tolerated cell delay variation CDV. This first process does not strictly form part of the present invention and will therefore not be described in any further detail.

Figure 1B:
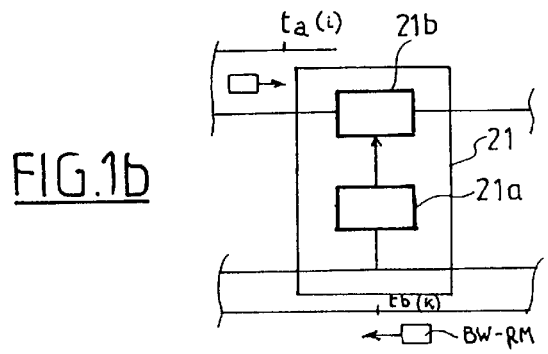
FIG. 1b is an explanatory diagram of the processes implemented in a user-network interface unit according to a preferred embodiment of the invention.

The second process is a programming process represented by a box 21a in FIG. 1b which, when a backward-resource management cell BW-RM of order k arrives at time $t_b(k)$, determines, from a rate request ER(k) contained in a field of the said BW-RM cell, the value of the rate to be controlled $ACR(t_p(k))$ at a future time $t_p(k)$ which, in the remainder of the description, will be referred to as the programming time. At time $t=t_p(k)$, the programming process transmits this value $ACR(t_p(k))$ to the control process 21b.

It should be stated that each backward management cell BW-RM comprises a specific field which carries a rate request which will, in the remainder of the description, be denoted ER(k), k being the order of the said cell.

According to the invention, a rate request which corresponds to an increase with respect to the programmed rate at time $t_b(k)$ delayed by the minimum forward-backward delay $\tau_3$ will be taken into account at the departure time $t_b(k)$ delayed by the minimum forward-backward delay $\tau_3$. Conversely, a rate request which corresponds to a decrease with respect to the programmed rate at time $t_b(k)$ delayed by the minimum forward-backward delay $\tau_3$ will be taken into account at a time greater than the departure time $t_b(k)$ delayed by the minimum forward-backward delay $\tau_3$. If in addition the rate request is less than all the programmed rates beyond the departure time $t_b(k)$ delayed by the minimum forward-backward delay $\tau_3$, it will be programmed at the departure time $t_b(k)$ delayed by the maximum forward-backward delay $\tau_2$.

In the first case, the change made to the control of the flow of data sent by the source terminal 10 (in the forward direction) will therefore be applied as soon as possible, that is to say at the programming time $t_p^-(k)=t_b(k)+\tau_3$. This programming time will, in the remainder of the description, be referred to as the closest programming time and will be denoted $t_p^-(k)$.

On the other hand, in the latter case, this change will be applied as late as possible at the programming time $t_p^+(k)=t_b(k)+\tau_2$. In the remainder of the description, this programming time will be referred to as the furthest away programming time and will be denoted $t_p^+(k)$.

Thus the programming process therefore programmes the changes in control rate on the basis of "worst case" situations favourable to the user, according to the type of change.

It should be noted that the programming process 21 a according to the invention is implemented each time a BW-RM cell arrives at the interface unit 21. The complexity is therefore reduced compared with the programming processes of the reference algorithm A of the prior art which effect a programming for each data cell arriving at the interface unit, the data cells being greater in number than the number of resource management cells.

In the remainder of the description, the rate controlled by the interface unit 21 at time t will therefore be denoted ACR(t). If the time t is in the future, it will be preferred to refer to this rate as "programmed rate at time t".

Figure 2:
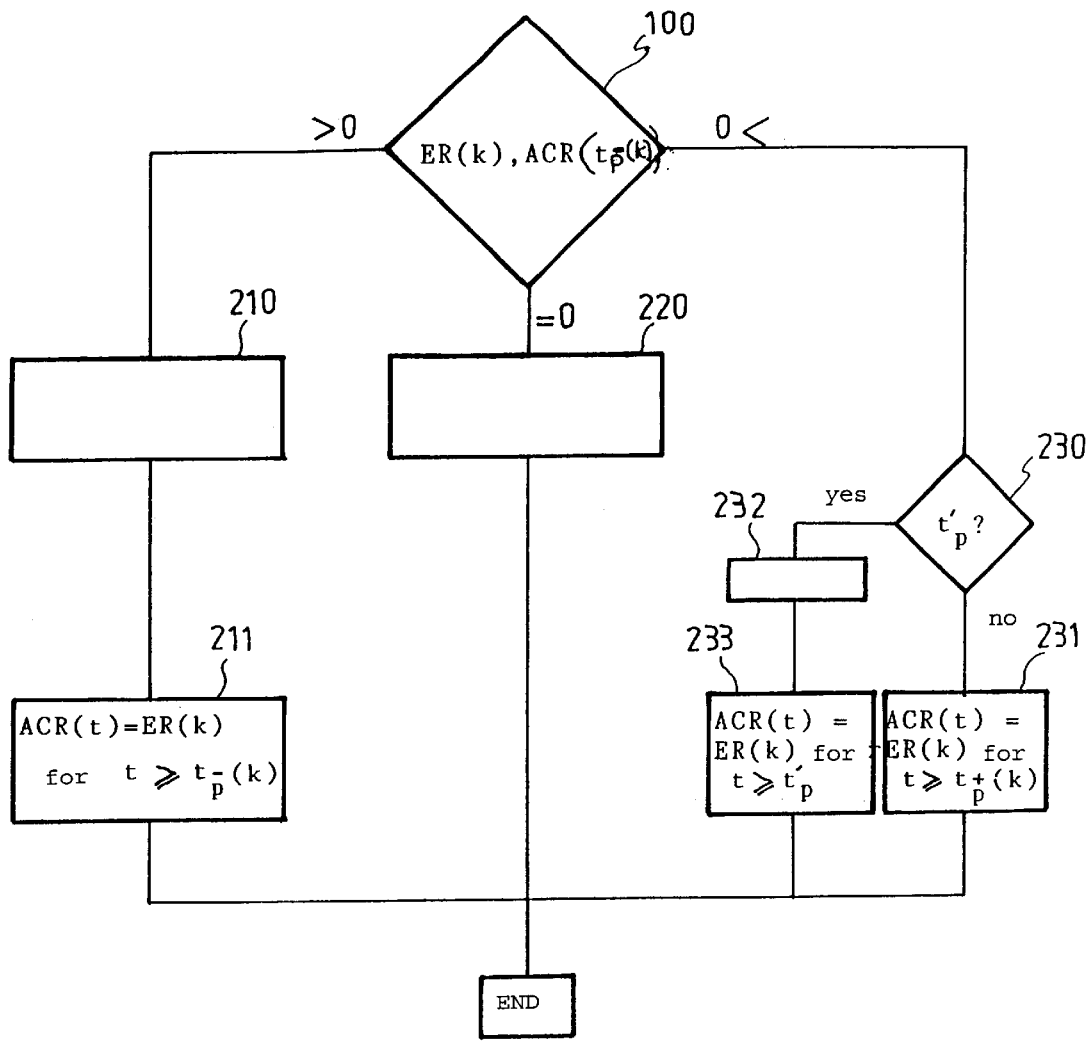
FIG. 2 is a flow diagram illustrating a first embodiment of a programming method according to a preferred embodiment of the invention, FIG. 3. is a diagram illustrating the unfolding of a method according to the first embodiment of the invention for an example of six cells arriving at the user-network interface.

The method of the invention is now described in relation to FIG. 2. When a backward-resource management cell BW-RM with reference number k arrives at the interface unit, a comparison is made, at a step 100, between the requested rate ER(k) which it carries and the programmed rate $ACR(l,t_p^-(k))$ at the closest programming time, therefore corresponding to the time distant from the time of this arrival $t_b(k)$ by the minimum forward-backward delay $\tau_3(t_p^-(k)=t_b(k)+\tau_3)$.

If the requested rate ER(k) is greater than the programmed rate at the closest programming time $ACR(l,t_p^-(k))$, then, at step 210, any rate programming provided beyond this programming time $t_p^-(k)$ is deleted and, at step 211, the controlled rate at this time $t_p^-(k)=t_b(k)+\tau_3$ and beyond this time is programmed to the value of the requested rate ER(k). This therefore gives ACR(t) for $t \geq t_p^-(k)$ which is equal to ER(k).

If the requested rate ER(k) is equal to the programmed rate $ACR(l,t_p^-(k))$ at the closest programming time, then, at step 220, any rate programming provided beyond the programming time $t_p^-(k)=t_b(k)+\tau_3$ is deleted.

If the requested rate ER(k) is less than the programmed rate $ACR(l,t_p^-(k))$, there is sought, at step 230, if it exists, a change in programming rate ER' for a programming time $t'_p$ which is on one hand both greater than and closest to the closest programming time $t_p^-(k)=t_b(k)+\tau_3$ and which on the other hand corresponds to a change towards a rate lower than the requested rate ER(k) (ER'$\leq$ER(k)).

If this change does not exist, the controlled rate is programmed, at step 231, at time $t_p^+(k)=(t_b(k)+\tau 2)$ and beyond this time, to the value of the requested rate ER(k). This therefore gives ACR(t) for $t \geq t_p^+(k)$ which is equal to ER(k).

On the other hand, if it does exist, there are deleted, at step 232, all programmings provided beyond the programming time $t'_p$ of this change, that is to say for which $t_p \geq t'_p$, and there is programmed, at step 233, for this time $t'_p$ and all times beyond, a rate equal to the requested rate ER(k). This therefore gives ACR(t) for $t \geq t'_p$ which is equal to ER(k).

Figure 3:
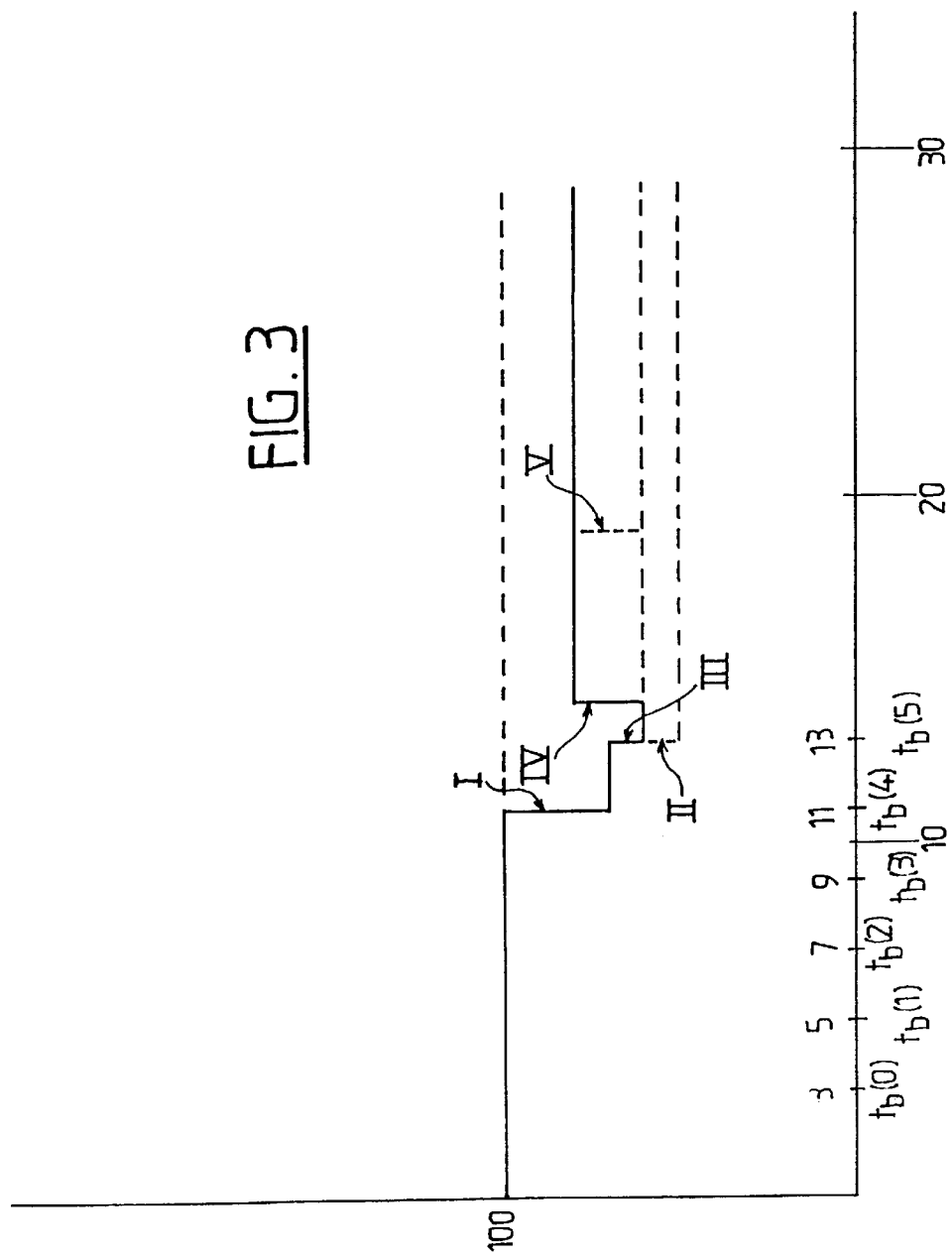

To illustrate this method, the graph of FIG. 3 relating to an example of six arrivals of resource management cells BW-RM has been constructed. The minimum forward-backward delay $\tau_3$ is equal to 5 time units whilst the maximum delay $\tau_2$ is equal to 8 time units.

The first arrives at time $t_b(0)=3$ and carries the rate ER(0)=70. At time t=3, the closest programming time is the time $t_b(0)+\tau_3=8$. At this time, the programmed rate is 100. Consequently, the rate carried by the cell 0 is less than the programmed rate at the closest programming time. Moreover, there is no programming at a rate less than ER(0) which is provided beyond the closest programming time. As a result a programming is provided at the rate of 70 for the furthest away programming time, that is to say tb(0)+$\tau_2$=11. The resulting step has been marked I.

At time $t_b(1)=5$, the second cell arrives carrying the rate ER(1)=50. At time t=5, the closest programming time is the time $t_b(1)+\tau_3=10$. At this time, the programmed rate is 100. Consequently, the rate carried by the cell 1 is less than the programmed rate at the closest programming time. Moreover, there is no programming at a rate less than the rate ER(1) which is provided beyond the closest programming time $t_b(1)+\tau_3=10$. As a result a programming at the rate of 50 is provided for the furthest away programming time, that is to say $t_b(1)+\tau_2=13$. The resulting step has been marked II.

At time $t_b(2)=7$, the third cell arrives carrying the rate ER(2)=60. At time t=7, the closest programming time is the time $t_b(2)+\tau_3=12$. At this time, the programmed rate is 70. Consequently, the rate carried by the cell 2 is less than the programmed rate at the closest programming time. Moreover, it is noted that the first programming beyond the closest programming time and for which the rate is less than the requested rate is situated at time $t_p'=13$. As a result a programming is provided at the rate of 60 for the programming time $t'_p=13$. The resulting step has been marked III.

At time $t_b(3)=9$, the fourth cell arrives carrying the rate ER(3)=80. At time t=9, the closest programming time is the time $t_b(3)+\tau_3=14$. At this time, the programmed rate is 60. Consequently, the rate carried by the cell 3 is greater than the programmed rate at the closest programming time. As a result a programming is provided at the rate of 80 for the programming time t=14. The resulting step has been marked IV.

At time $t_b(4)=11$, the fifth cell arrives carrying the rate ER(4)=60. At time t=11, the closest programming time is the time $t_b(4)+\tau_3=16$. At this time, the programmed rate is 80. Consequently the rate carried by the cell 4 is less than the programmed rate at the closest programming time. Moreover, there is no programming provided beyond the closest programming time. As a result a programming is provided at the rate of 60 for the furthest away programming time, that is to say $t_b(4)+\tau_2=19$. The resulting step has been marked V.

It should be noted that, at this cell arrival time equal to 11, the control rate has changed from 100 to 70, as had previously been programmed.

At time $t_b(5)=13$, the sixth cell arrives carrying the rate ER(5)=80. At time t=13, the closest programming time is the time $t_b(3)+\tau_3=18$. At this time, the programmed rate is already 80. Consequently, the rate carried by the cell 5 is equal to the programmed rate at the closest programming time. As a result any programming is deleted beyond the closest programming time, that is to say t=18 and, in particular, the programming, marked V, which was provided at time t=19.

It should also be noted that, at this cell arrival time equal to 13, the control rate has changed from 70 to 60, as had previously been programmed.

For implementing the method, provision has been made for keeping a list l of programming events each defined, for a BW-RM cell of order k, on the one hand by the programming time $t_p(k)$ and on the other hand by the rate to be programmed at this time $ACR(t_p(k))$. The index p indicates that it is a programming time and the reference k indicates that this time was determined at the arrival of the cell of order k. Thus the term programming event is given to a pair of values $\{ACR(t), t\}$ where ACR(t) is the control rate which is to be programmed at a time t.

In addition, a function which gives, at any time t, the value of the control rate is defined. This function is denoted ACR(l, t) and is defined as follows:

if, in the list l, there exists at least one programming event $\{ACR(t_p), t_p\}$ provided at a time $t_p$ between the present time $t_0$ and the time t, it is equal to the programming rate of this event $ACR(t_p)$ and, if there are a number of them, it is equal to the programming rate of the last of these events, and if, still in this list, there exist no programmed events, the value of the function ACR(l, t) is equal to the value of the current programming rate.

For example, if, at a time $t_0=0$, the following list is considered:

| | |
|---|---|
| 100 | 5 |
| 70 | 10 |
| 50 | 15 | the function ACR(l, 3) $t_1$=returns at the value of the current programming rate which is for example 110. The function ACR(l, $t_1=7$) is equal to the programming rate of the event which is situated between the time $t_0=0$ and the time $t_1=7$, that is to say the time $t_p(k)=5$. This value is therefore 100. The function ACR(l, $t_2=17$) is equal to the programming rate of the event which is situated between the time $t_0=0$ and the time $t_2=17$ which is closest to the time $t_2=17$. This is therefore the time $t_p(k)=15$ for which the rate is 50. Therefore ACR(l, $t_2=17$)=50.

In the remainder of the description, the value of this function ACR(l, t) will be referred to as the "programmed rate at time t".

The method of the invention can then be written, in the form of pseudo-code, in the following way:

For any time $t_b(k)$ corresponds to the arrival of a B-RM cell carrying the rate ER(k):

if $ER(k)>ACR(l, t_p^-(k)=t_b(k)+\tau_3)$ then delete from the ordered list l all the programming events $\{ACR(i), t_p(i)\}$ such that $t_p(i) \geq t_p^-(k)$ and add the event $\{ACR(t_p(k)), t_p(k)\}$ with $ACR(t_p(k))=ER(k)$ and $t_p(k)=t_b(k)+\tau_3$.

if $ER(k)=ACR(l, t_p^-(k))$ then delete from the ordered list l all the programming events $\{ACR(t_p(i)), t_p(i)\}$ such that $t_p(i)>t_p^-(k)$.

if $ER(k)<ACR(l, t_p^-(k))$ then seek in the list the event $\{ACR', t'_p\}$ of smallest $t'_p$ such that $t'_p>t_p^-(k)$ and $ACR' \leq ER(k)$, then if the element $\{ACR', t'_p\}$ exists, then delete from the ordered list l all the programming events $\{ACR(t_p(i)), t_p(i)\}$ such that $t_p(i) \geq t'_p$ and add the event (ER(k), $t'_p$).

if the element $\{ACR', t'_p\}$ does not exist then add the element $\{ER(k), t_p^+(k)\}$.

At the expiry of the programming time (t=$t_p(k)$), the following operations are carried out:

make the control rate ACR(t) equal to the programmed rate $ACR(t_p(k))$ for this time, delete from the list l the corresponding event $\{ACR(t_p(k)), t_p(k)\}$.

The above example will be taken up again to explain this first embodiment with a list l of events.

The first BW-RM cell arrives at time $t_b(0)=3$ and carries the rate ER(0)=70. The value of the function ACR(l, $t_p(k)+\tau_3$) is determined which, since there are no events provided in the list l, is equal to the current control rate value, that is to say, in the example given, 100.

At time t=3, the rate carried by the cell 0 is less than the programmed rate at the closest programming time. As there is no programming provided beyond the closest programming time, the event $\{70, 11\}$ is placed in the list l.

At time $t_b(1)=5$, the second cell arrives carrying the rate ER(1)=50. The closest programming time is equal to 10. There are therefore no programmings provided between the current time equal to 5 and this closest programming time equal to 10. Consequently, the value of the function ACR(l, $t_p^-(k)$) is once again equal to 100.

Thus the rate carried by the cell is again less than the programmed rate at the closest programming time. As there is no programming at a rate less than ER(1) which is provided beyond the closest programming time, the event {50, 13} is added to the list. The list 1 is now as follows:

| | |
|---|---|
| 70 | 11 |
| 50 | 13 |

At time $t_b(2)=7$, the third cell arrives carrying the rate ER(2)=60. The closest programming time is equal to $t_b(2)+\tau_3=12$. The programming event {70, 11} is provided between the current time and the closest programming time. Therefore the function ACR(l, $t_p(k)+\tau_3$) is equal to 70. As a result the rate carried by the BW-RM cell is less than the value of this function. Moreover, the first event provided beyond the closest programming time and for which the rate is less than the requested rate is situated at the time $t_p'=13$. The event {50, 13} is therefore deleted from the list 1 and the event {60, 13} is added thereto. The list is now as follows:

| | |
|---|---|
| 70 | 11 |
| 60 | 13 |

At time $t_b(3)=9$, the fourth cell arrives carrying the rate ER(3)=80. At time t=9, the closest programming time is the time tb(3)+$\tau_3$=14. It will be understood that the function ACR is equal to 60. Consequently, the rate carried by the cell is greater than this value. The event {80, 14} is therefore added to the list 1.

The list 1 becomes as follows:

| | |
|---|---|
| 70 | 11 |
| 60 | 13 |
| 80 | 14 |

At time t=11, the control rate ACR(t) becomes equal to 70 and the corresponding event in the list 1 is withdrawn therefrom. The list 1 becomes:

| | |
|---|---|
| 60 | 13 |
| 80 | 14 |

In addition, at this time, the fifth cell arrives carrying the rate ER(4)=60. The closest programming time is the time tb(3)+$\tau_3$=16. The function ACR is then equal to 80. Consequently, the rate carried by the cell 4 is less than this value. Moreover there is, in the list 1, no event provided for a time beyond the closest programming time. As a result the event {60, 19} is added to the list 1. The list 1 becomes:

| | |
|---|---|
| 60 | 13 |
| 80 | 14 |
| 60 | 19 |

At time t=13, the control rate ACR(t) becomes equal to 60 and the first event in the list 1 is withdrawn therefrom. The list 1 therefore becomes:

| | |
|---|---|
| 80 | 14 |
| 60 | 19 |

At this time, the fourth cell arrives carrying the rate ER(5)=80. The closest programming time is the time tb(3)+$\tau_3$=18. There is an event between the present time and the closest programming time which is the event {80, 14}. The function ACR is therefore equal to 80. The rate carried by the cell 5 is therefore equal to this value. As a result any event provided at times beyond the closest programming time, that is to say t=18 and, in particular, the event {60, 19}, is deleted from the list. The list therefore becomes:

| | |
|---|---|
| 80 | 14 |

It can be shown mathematically that the method which has just been described gives the same performance as the algorithm A of the prior art.

In order to prevent overflows of the memory files in which the list of events is recorded, it has been sought to improve the method described above so as to limit the number of elements it contains. It has therefore been sought to limit this number of elements to N programming events {ER(i), $t_p(i)$}, and to do this a reduction rule will be defined which will be implemented by default when N+1 elements are in the list 1 and whose object will be to delete an event from the list 1.

The constraint to be met for the rules for reduction to N programmings for the generic algorithm consists of providing a trace of rates to be controlled superior to that which would be provided by the reference algorithm A or the generic algorithm with no memory limitation. Thus it is possible to envisage any type of rule for reduction to N programmings provided that this constraint is met.

Figure 4:
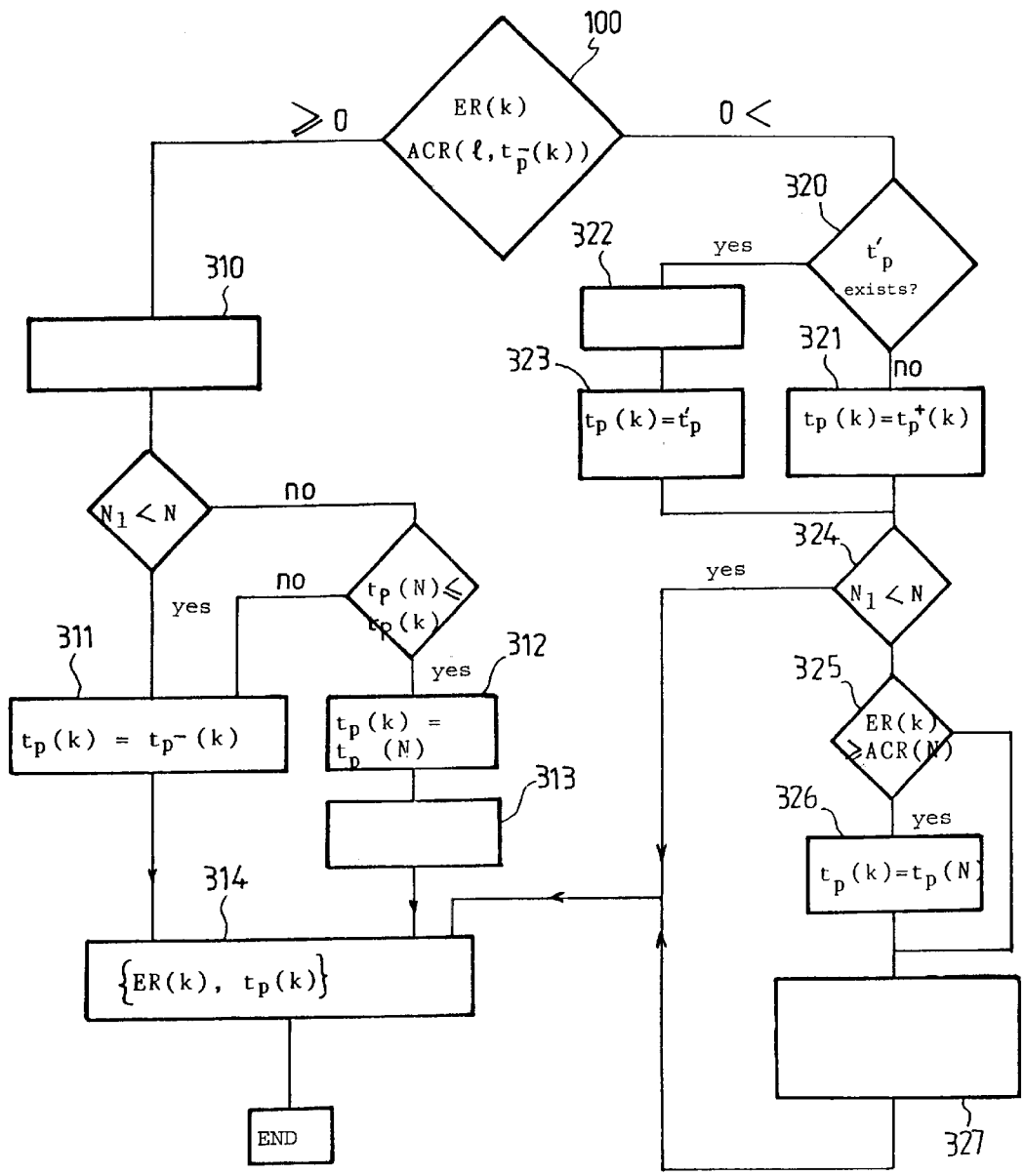
FIG. 4 is a flow diagram illustrating a second embodiment of a programming method according to a preferred embodiment of the invention.

There is described below, in relation to FIG. 4, a first embodiment of a method according to the invention in which the list is limited to N elements. According to this mode, as in the previous embodiment, at step 100 the requested rate ER(k) carried by the BW-RM resource management cell of order k which arrives at time $t_b(k)$ at the interface unit 21 is compared with the value taken by the function ACR(l, $t_b(k)+\tau_3$). This function is identical to that previously described.

Following this comparison, if the requested rate ER(k) is greater than or equal to the programmed rate at the closest programming time ACR(l, $t_b(k)+\tau_3$), then, as before, all the programming elements provided at a time equal to or greater than the closest programming time ($t_b(k)+\tau_3$) are deleted from the list 1 at step 310.

If the list 1 is not full, that is to say if the number of programming elements $N_1$ contained in the list 1 is less than the limit number N, the programming time $t_p(k)$ is, as before, equal to the closest programmning time $t_p(k)=t_b(k)+\tau_3$ (see step 311).

On the other hand, if the list is full (the number of elements $N_1$ in the list is equal to N), then if the programming time $t_{pf}(N)$ of the last event in the list 1 (that is to say of the event whose programming time, denoted $t_{pf}(N)$, is the furthest away) is less than or equal to the closest programming time $t_p^-(k)$, the programming time $t_p(k)$ becomes equal to the programming time $t_{pf}(N)$ of the last recorded element in the list (step 312). In addition, the last recorded element in the list {ACR(N),$t_{pl}$(N)} is deleted from the list (step 313).

If the programming time $t_{pl}$(N) of the last element in the list is greater than the closest programming time $t_p^-$(k), the programming time $t_p$(k) becomes equal to the closest programming time $t_p$(k)=$t_p^-$(k)(see step 311).

Following these operations, the element {ACR($t_p$(k)),$t_p$(k)} with ACR($t_p$(k))=ER(k) is recorded, at step 314, in the list l.

The notation followed here corresponds to the use of a list whose events are ordered in increasing order of programming times, which are denoted $t_{pl}$, with p signifying programming and l signifying present in the list. Thus, for a list l of dimension N, the last event is that of order N. The first event in the list l is that of order 1 and corresponds to the event whose programming time $t_{pl}$ is the smallest in the list l. In general terms, the event of order X is denoted {ACR (X)),$t_{pl}$(X)}.

If the requested rate ER(k) is less than the programmed rate ACR($t_p^-$(k),l), there is sought in the list l, at step 320, if it exists, the event {ACR($t'_p$), $t'_p$} programmed at a time $t'_p$ beyond the closest programming time $t_p^-$(k) for a rate ACR($t'_p$) less than or equal to the requested rate ER(k). Should there exist a number of events {ACR($t'_p$), $t'_p$}, only the one which has the smallest of the times $t'_p$ will be sought.

If this event does not exist, the programming time $t_p$(k) becomes equal to the furthest away programming time $t_p^+$(k)=$t_b$(k)+$\tau_2$ (step 321).

On the other hand, if this element {ACR($t'_p$), $t'_p$) exists, there is deleted from the list l, at step 322, any programmed event at a time equal to and beyond the programming time $t_p'$ of this event. In addition, at step 323, the programming time $t_p$(k) is made equal to the programming time $t_p'$ of this element.

It is checked, at step 324, whether the number of programming elements present in the list l is less than or equal to N.

If the list l is full (N programming elements are in the list l) (step 325), then if the requested rate ER(k) is greater than or equal to the programming rate ACR(N) of the last recorded element in the list l, the programming time $t_p$(k) is modified at step 326 so that it becomes equal to the programming time $t_{pl}$(N) of this element.

The penultimate element in the list is modified at step 327 so that its rate ACR(N−1) is the greater of the two values corresponding respectively to the programming rates of the last element and of the penultimate element: ACR(N−1)= MAX(ACR(N), ACR(N−1)). Then the last element {ACR (N),$t_{pl}$(N)} is deleted.

In all cases, the element {ACR($t_p$(k)),$t_p$(k)} is next added to the list l with ACR($t_p$(k))=ER(k) corresponding to the requested rate ER(k) for the determined programming time $t_p$(k).

Figure 5:
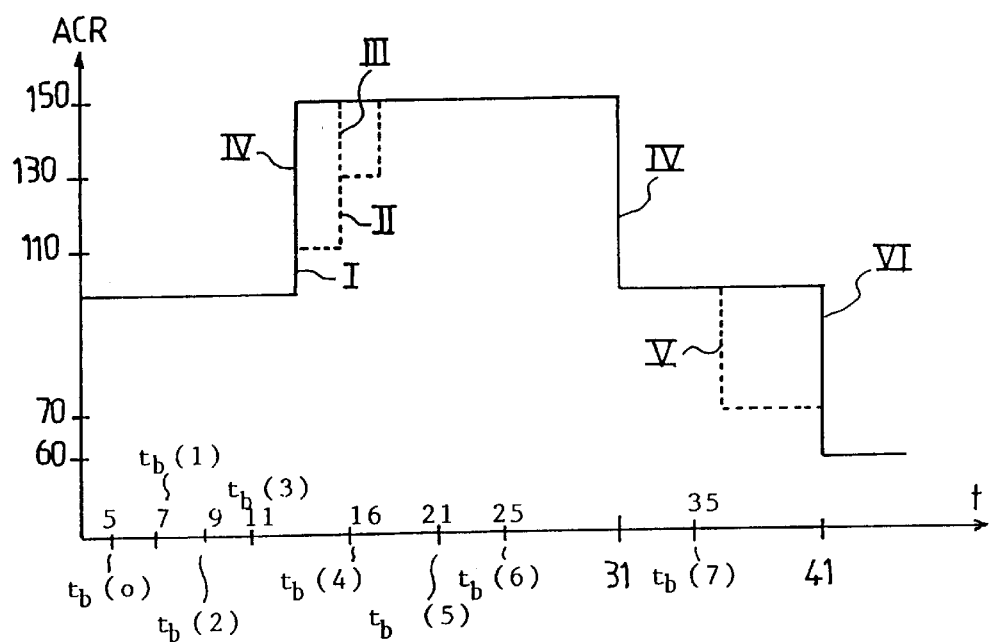
FIG. 5 is a diagram illustrating the unfolding of a method according to the second embodiment of the invention for an example of eight cells arriving at the user-network interface.

To illustrate this embodiment, the graph of FIG. 5 has been constructed for the arrival of 8 cells at time $t_b$=5, 7, 9, 11, 16, 21, 25 and 35. These cells carry respectively the rates ER=110, 130, 150, 100, 70, 50 and 60. The shortest delay $\tau_3$ is equal to 10 whilst the longest delay $\tau_2$ is equal to 20. The number of events supported in the list l is N=2.

The first cell therefore arrives at time $t_b$(0)=5 and carries the rate ER(0)=110. The closest programming time is equal to 15 for which the programmed rate is 100. It will be understood that the programmed rate is in reality the result of the function ACR(l, $t_b$(k)+$\tau_3$) as described above. As before, the first element in the list will therefore be as follows: {110, 15} corresponding to the carried rate ER(0) and to the closest programming time $t_b$(0)+$\tau_3$. The corresponding resulting step has been marked I.

The process will be similar for the second cell 1 which arrives at time $t_b$(1) and results in the recording in the list l of the second element {130, 17}. The corresponding step has been marked II.

The list l is then in the following form:

| | |
|---|---|
| 110 | 15 |
| 130 | 17 |

The third cell arrives at the time $t_b$(2)=9 and the carried rate is ER(2)=150. This rate is greater than that provided at the closest programming time, namely $t_b$(2)+$\tau_3$=19 which is 130. However, the list l is full (the number of elements in the list l is equal to N=2). The programming time $t_{pl}$(N) for the last recorded element in the list is the time 17 which is less than the closest programming time. As a result the programming time becomes equal to this programming time $t_p$(k)= $t_{pl}$(N). The last element is deleted from the list, namely the element {130, 17}. Then there is added to the list the element {ER(k), $t_p$(k)}, that is to say the element {150, 17}. The corresponding step has been marked III.

The list l is then in the following form:

| | |
|---|---|
| 110 | 15 |
| 150 | 17 |

The fourth cell arrives at the time $t_b$(3)=11. The carried rate is ER(3)=100 which is less than the programmed rate at the closest programming time which is now 150. It can be seen that the programming time is now equal to $t_p$(3)=$t_b$(3)+ $\tau_2$, that is to say the time $t_p$(3)=31. However, the list is full. The programming time is not modified since the requested rate ER(3)=100 is less than the rate of the last element recorded in the list l, that is to say 150.

The rate of the penultimate element ACR(N−1) is equal to the rate of the last element ACR(N)=150. There is therefore now the event {150, 15}. The last element {AC(N), $t_{pl}$(N)}= {150, 17} is then deleted from the list l.

The list l is then in the following form:

| | |
|---|---|
| 150 | 15 |

Finally, the element {ACR(k), $t_p$(k)} is added to the list l, which is now as follows:

| | |
|---|---|
| 150 | 15 |
| 100 | 31 |

The step corresponding to this series of operations has been marked IV.

At time t=15, the controlled rate changes from 100 to 150 and the corresponding event {150, 15} is deleted from the list l, which now contains only the element {100, 31}. It is therefore in the form:

| | |
|---|---|
| 100 | 31 |

The fifth cell arrives at time $t_b(4)=16$ with a carried rate which is equal to $ER(4)=70$, less than the programmed rate at the closest programming time. It can then be seen that the programming time is now equal to $t_p(4)=t_b(4)+\tau_2$, that is to say the time $t_p(4)=36$.

The element $\{ER(k), t_p(k)\}$ is added to the list l, which is now as follows:

| | |
|---|---|
| 100 | 31 |
| 70 | 36 |

The corresponding step has been marked V.

The sixth cell arrives at time $t_b(5)=21$. The carried rate is $ER(5)=50$ which is less than the programmed rate at the closest programming time. It can be seen that the programming time is now equal to $t_p(5)=t_b(5)+\tau_2$, that is to say the time $t_p(5)=41$. However, the list is full. The programming time is not modified since the requested rate $ER(k)$ is less than the rate of the last element recorded in the list l.

The rate of the penultimate element $ACR(N-1)$ is not modified and the last element $\{ACR(N), t_{pl}(N)\}=\{70, 36\}$ is deleted.

Finally, the element $\{ER(k), t_p(k)\}$ is added to the list l, which is now as follows:

| | |
|---|---|
| 100 | 31 |
| 50 | 41 |

The corresponding step has been marked VI.

The algorithm according to this second embodiment can be written in the so-called pseudo-code form in the following manner:

A) For each time $t_b(k)$ corresponding to the arrival of a cell carrying the requested rate $ER(k)$:
  1) if $ER(k) \geq ACR(l, t_p^-(k))$ then
     delete from the ordered list l all the programming elements $\{ACR(i), t_{pl}(i)\}$ such that $t_{pl}(i) \geq t_p^-(k)$,
     if the list is full (N elements in the list) then
       if $(t_{pl}(N) \leq t_p^-(k)$ then $t_p(k)=t_{pl}(N)$
       delete the last element $(ACR(N), t_{pl}(N))$
       else $t_p(k)=t_p^-(k)$
  2) if $ER(k) < ACR(l, t_p^-(k))$ then
     seek in the list l the element $\{ACR', t_p'\}$ with the smallest $t'_p$ such that $ACR' \leq ACR(k)$ and $t'_p > t_p^-(k)$
     if the element $\{ACR', t_p'\}$ exists, then
       delete from the ordered list l all the programming elements $\{ACR(i), t_{pl}(i)\}$ such that $t_{pl}(i) \geq t'_p$
       and make $t_p(k) = t'_p$,
     if the element $(ER', t_p')$ does not exist then $t_p(k)=t_p^+(k)$.
     If the list is full (N elements in the list) then
       if $ER(k) \geq ACR(N)$ then $t_p(k)=t_{pl}(N)$
       $ACR(N-1)=Max(ACR(N-1), ACR(N))$
       delete the last element $\{ACR(N), t_{pl}(N)\}$
  3) add to the list, after the last programming, the element $\{ACR(t), t\}$ with $ACR(t)=ER(k)$ and $t=t_p(k)$.
B) at the expiry of the first programming time $(t=t_p(1))$:
  $ACR(t)=ACR(1)$,
  delete the first element $\{ACR(1), t_p(1)\}$ from the list l.

Figure 6:
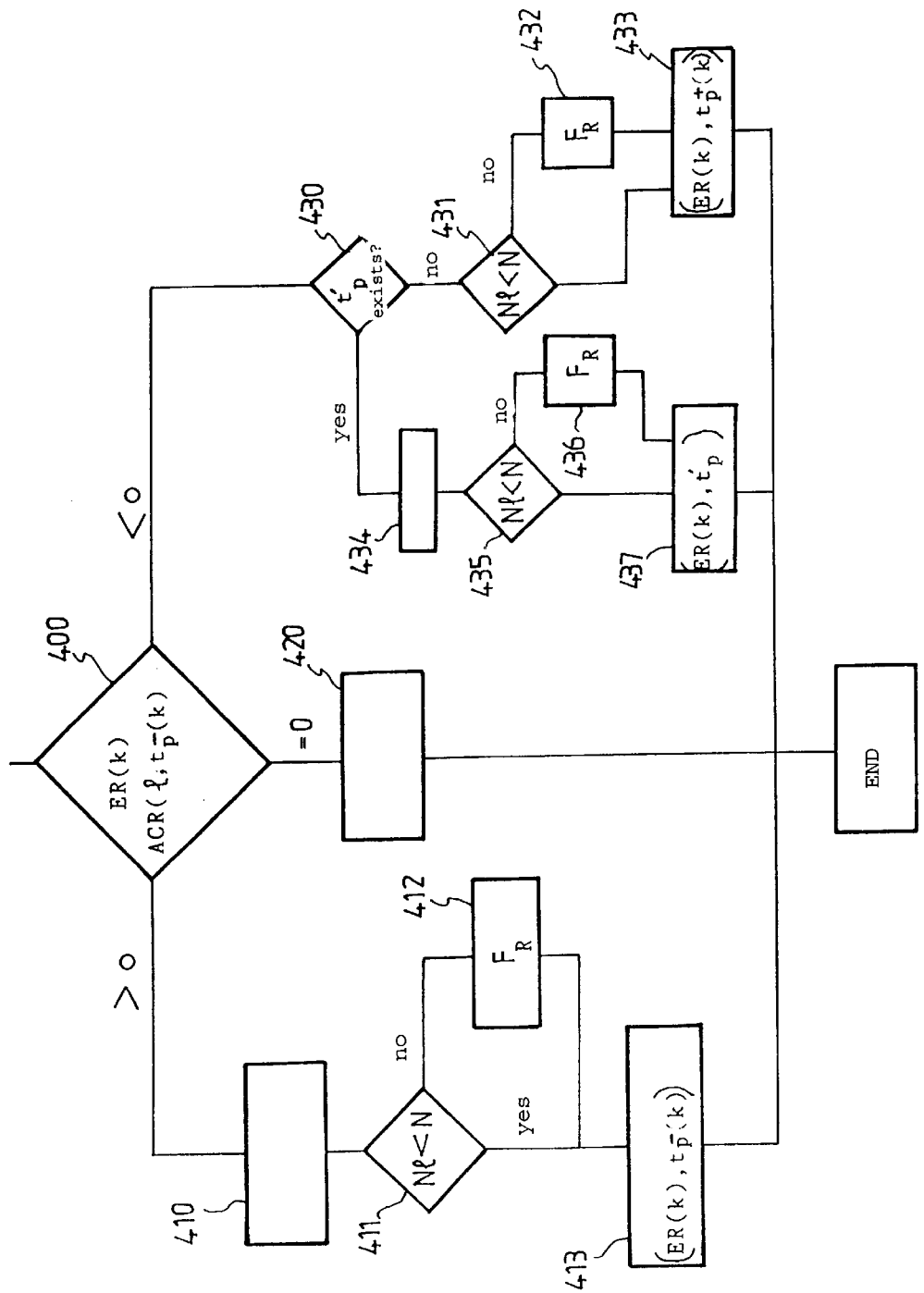
FIG. 6 is a flow diagram illustrating a third embodiment of a programming method according to a preferred embodiment of the invention.

Another embodiment according to the invention is proposed below, described in relation to FIG. 6.

As in the previously described embodiments, the requested rate $ER(k)$ is compared at step 400 with the programmed rate at the closest programming time. It should be stated that the value of this rate is determined by the function $ACR(l, t)$ described above.

If the requested rate $ER(k)$ is greater than the programmed rate at the closest programming time $ACR(t_b(k)+\tau_3)$, then, as before, all the programming events provided at a time greater than or equal to the closest programming time $(t_b(k)+\tau_3)$ are deleted from the list l at step 410.

If the list is full (the number of events stored in the list l is equal to N) (step 411), at step 412 a function $F_R$ is implemented whose object is to reduce the number of elements in the list l. An example embodiment of this function is given below. On the other hand, if the list is not full, the following step is passed to directly. This, step 413, consists of programming the event $\{ACR(t_p(k)), t_p(k)\}$ with $ACR(t_p(k))=ER(k)$ and $t_p(k)=t_p^-(k)$.

If the requested rate $ER(k)$ is equal to the programmed rate at the closest programming time $ACR(l, t_p^-(k))$, then at step 420 there are deleted from the list l all the programming elements provided beyond this closest programming time $t_p^-(k)=(t_b(k)+\tau_3)$.

If the requested rate $ER(k)$ is less than the programmed rate $ACR(l, t_p^-(k))$, there is sought in the list l, at step 430, if it exists, the event $\{ACR(t'_p(k), t'_p(k)\}$ programmed at a time $t'_p(k)$ beyond the closest programming time such that the rate $ACR(t'_p(k))$ is less than the requested rate $ER(k)$. If a number of events $\{ACR(t'_p(k), t'_p(k)\}$ exist, only the first of these events for which the time $t'_p(k)$ is the smallest will be sought.

If this event does not exist and the list l is full (step 431), at the step 432 the reduction function $F_R$ mentioned above is implemented. Then, at step 433, there is added to the list l the programming element $\{ACR(t_p(k)), t_p(k)\}$ whose rate $ACR(t_p(k))$ corresponds to the requested rate $ER(k)$ and whose programming time is the furthest away programming time $t_p(k)=t_b(k)+\tau_2$.

If the event sought at step 430 does not exist and in addition the list l is not full (step 431), there is added directly the programming element $\{ACR(t_p(k)), t_p(k)\}$ whose rate $ACR(t_p(k))$ corresponds to the requested rate $ER(k)$ and whose programming time is the furthest away programming time $t_p^+(k)=t_b(k)+\tau_2$ (step 433).

On the other hand, if the element sought $(ACR', t_p')$ exists, there is deleted, at step 434, any programming provided at a time greater than or equal to the programming time $t_p'$.

If the list l is full (there are N programming elements in the list l) (step 435), there is implemented, at step 436, the reduction function $F_R$ mentioned above, and then there is added, at step 437, to the list l, the element $\{ACR(t_p(k)), t_p(k)\}$ whose rate $ACR(t_p(k))$ corresponds to the requested rate $ER(k)$ and whose programming time $t_p(k)$ becomes equal to the programming time $t_p'$ of the programming element sought.

On the other hand, if the list l is not full, there is added directly, also at step 437, the element $\{ACR(t_p(k)), t_p(k)\}$ whose rate $ACR(t_p(k))$ corresponds to the requested rate $ER(k)$ and whose programming time $t_p(k)$ becomes equal to the programming time $t_p'$ of the programming element sought.

The function $F_R$ will first of all determine two consecutive programming events in the list l and will finally give a single event which will be such that an over-evaluation of the rate to be controlled will result therefrom. The choice of the two events considered is advantageously made so as to limit the control rate over-evaluation which results from application of the function $F_R$.

According to an advantageous embodiment of the reduction function $F_R$, this consists of first of all seeking in the list l, which is ordered in increasing order of the programming times $t_{pl}$, the two successive elements for which the product of the increase or decrease in rate and the measurement of the time interval between their two programming times is a minimum. Thus there are sought the two elements {ACR(X),$t_{pl}$(X)} and {ACR(X−1),$t_{pl}$(X−1)} such that the value of the expression |(ACR(X)−ACR(X−1)|.($t_{pl}$(X)−$t_{pl}$(X−1) is a minimum, X being the order in the list l of the second of these two successive elements.

If the programming rate ACR(X) of the second element is greater than the programming rate ACR(X−1) of the first element, the second element is deleted and the rate of the second is assigned to the first. Thus, of the two elements {ACR(X),$t_{pl}$(X)} and {ACR(X−1),$t_{pl}$(X−1)}, there will remain only one element {ACR(X), $t_{pl}$(X−1)} whose rate corresponds to the programming rate of the second element and whose programming time is that of the first.

On the other hand, if the programming rate ACR(X) of the second element is not greater than the programming rate ACR(X−1) of the first element, the second element is deleted.

The order of the elements of order greater than or equal to X is modified so that the order of the free position in the list l is that of order N. This is expressed by the implementation of the following instruction:

For $i=X$ to $N-1$, $ACR(i)=ACR(i+1)$ and $t_{pl}(i)=t_{pl}(i+1)$.

All these operations can be expressed by the following pseudo-code:

If ACR(X)>ACR(X−1), then the greater of the last two rates is programmed.

$ACR(X-1)=ACR(X)$.

Delete the element of order X.

For i=X to N−1, the programmings are then shifted by one memory position.

$ACR(i)=ACR(i+1)$ and $t_{pl}(i)=t_{pl}(i+1)$

End of For.

Insert at order N the new event {ACR(N), $t_p$(N)}={ER(k), $t_p$(k)}.

Figure 7:
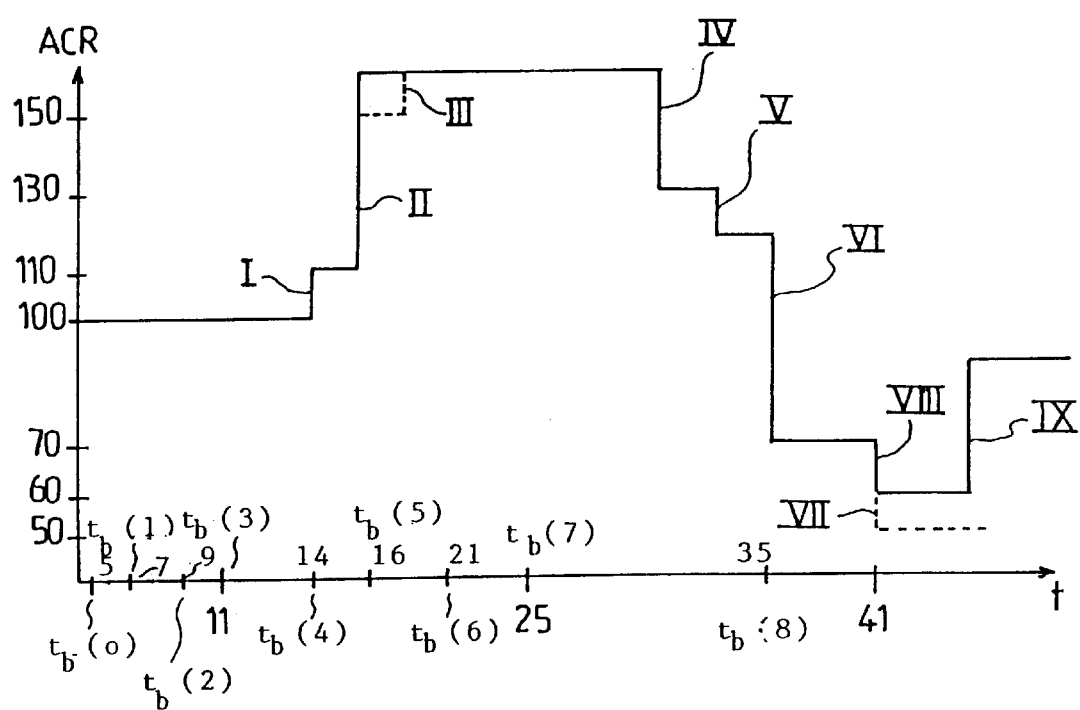
FIG. 7 is a diagram illustrating the unfolding of a method according to the third embodiment of the invention for an example of eight cells arriving at the user-network interface.

There will be given below, in relation to FIG. 7, an example implementation of the method according to this embodiment for the arrival of 9 cells at times $t_b$=5, 7, 9, 11, 14, 16, 21, 25 and 35. These cells carry respectively the rates ER=110, 150, 160, 130, 120, 70, 50, 60 and 90. The shortest delay $\tau_3$ is equal to 10 whilst the longest delay $\tau_2$ is equal to 20. The number of elements supported in the list l is N=4.

The first cell therefore arrives at time $t_b$(0)=5 and carries the rate ER(0)=110. The closest programming time is equal to 15, for which the programmed rate is 100. As before, the second element in the list will therefore be as follows: {110, 15} corresponding to the carried rate ER(0) and to the closest programming time $t_b$(0)+$\tau_3$. The corresponding rate step has been marked I.

The process will be similar for the second and third cells and results in the recording in the list l of the second element {150, 17} and the third element {160, 19}. The corresponding respective steps have been marked II and III.

The fourth cell arrives at time $t_b$(3)=11 and the carried rate is ER(3)=130. This rate is less than the one provided at the closest programming time, namely $t_b$(3)+$\tau_3$=21 which is 160. The search step does not succeed. The list l is not full and the element {130,31} whose rate is equal to the requested rate ER(3) and whose programming time is the furthest away programming time $t_p$(3)=$t_b$(3)+$\tau_2$ is added to the list l.

The list l is therefore in the following form:

| | |
|---|---|
| 110 | 15 |
| 150 | 17 |
| 160 | 19 |
| 130 | 31 |

The step corresponding to this last operation has been marked IV.

The fifth cell arrives at the time $t_b$(4)=14 and the carried rate is ER(4)=120 which is less than the programmed rate at the closest programming time. The search does not succeed. However, the list l is full. Use is therefore made of the reduction function which, as can easily be verified, leads to deletion of the programming element {150, 17} and to addition of the event {160, 17}. This is because the product |(ACR(X)−ACR(X−1)|.($t_{pl}$(X)−$t_{pl}$(X−1)=|160−150|.(19−17) is a minimum. Then there is added to the list l the element whose rate is equal to the requested rate ER(4) and therefore the programming time is the furthest away progranmming time $t_p$(4)=$t_b$(4)+$\tau_2$ is added to the list l.

The list l therefore becomes as follows:

| | |
|---|---|
| 110 | 15 |
| 160 | 17 |
| 130 | 31 |
| 120 | 34 |

The corresponding step resulting from these operations has been marked V.

The control corresponding to the element {110, 15} is implemented and this element is deleted from the list.

The sixth cell arrives at time $t_b$(5)=16 with a requested rate equal to 70. This rate is less than any programming and the element {70, 36} is added to the list l, which becomes:

| | |
|---|---|
| 160 | 19 |
| 130 | 31 |
| 120 | 34 |
| 70 | 36 |

The corresponding step resulting from these operations has been marked VI.

The control corresponding to the element {160, 19} is implemented and this element is deleted from the list.

At time $t_b$(6) equal to 21 the seventh cell arrives. It carries the requested rate ER(6)=50 which is less than any programming. As a result the element {50,41} is added to the list, which becomes:

| | |
|---|---|
| 130 | 31 |
| 120 | 34 |
| 70 | 36 |
| 50 | 41 |

The corresponding step resulting from these operations has been marked VII.

At time $t_b$(7) equal to 25 the eighth cell arrives, which carries the requested rate 60. The search results in the element {50, 41}, which is deleted from the list l. The list is not full and the element {60,41} is added to the list l, which becomes:

| | |
|---|---|
| 130 | 31 |
| 120 | 34 |
| 70 | 36 |
| 60 | 41 |

The corresponding step resulting from these operations has been marked VIII.

The controls corresponding to the elements {130,31} and {120,34} are implemented and these elements are deleted from the list l.

At time $t_b(8)$ equal to 35 the ninth cell arrives, which carries the requested rate 90, greater than the programmed rate for the closest programming time. The list l is not full and the programming element {90,45} is thus added to the list, which becomes:

| | |
|---|---|
| 70 | 36 |
| 60 | 41 |
| 90 | 45 |

The corresponding step resulting from these operations has been marked IX.

In the present description it is mainly the methods which have been described. However, it will be understood that the present invention also concerns user-network interface units which have means for implementing the steps of the methods described.

What is claimed is:

1. Method of controlling the conformity of the transmission rate of data cells transmitted by a source terminal in communication with a destination terminal, via a high-speed network, the said network having user-network interface units to which the said terminals are connected, the said source terminal periodically transmitting a so-called resource management cell which is returned by the destination terminal to the said source terminal in the form of a so-called backward-resource management cell, the said resource management cell comprising a control process including verifying the conformity of the rate of the cells transmitted by the said source terminal with a rate programmed by a process known as a programming process, the said programming process including at the arrival of a backward-resource management cell of order k at the said interface unit, of determining the time, referred to as the programming time ($t_p(k)$), of the taking into account, by the said control process, of the rate request (ER(k)) included in the field of the said cell, the said programming time being equal to the said arrival time ($t_b(k)$) delayed by thne minimum forward-backward delay ($\tau_3$) between the interface and the terminal, referred to as the closest programming time, in response to said taking into account at this closest programming time results in an increase in programmed rate and being greater than the closest programming time and less than the said arrival time ($t_b(k)$) delayed by a maximum forward-backward delay ($\tau_2$), ($t_b(k)+\tau_2$) being referred to as the furthest away programming time, if its taking into account at the said closest programming time ($t_b(k)+\tau_3$) had resulted in a reduction in transmission rate and, transmitting, at the expiry of the programmed time ($t_p(k)$), the said value of rate to be controlled (ACR($t_p(k)$)) to said control process for controlling the flow sent by the said source terminal.

2. Method according to claim 1, further including keeping a list of programming events, each event being defined by a pair of values, the first of which represents a rate value ACR($t_p(k)$) and the second of which represents the programming time $t_p(k)$ of the said rate value ACR($t_p(k)$), and the said list being ordered according to the said event programming time.

3. Method according to claim 2, further including defining a function ACR(l,t) which, from the events present in the list l, determines the value of the programmed rate at any time t, in order to know the programmed rate (ACR($t_p(k)$)) at the arrival time $t_b(k)$ delayed by the minimum forward and backward delay $\tau_3$ ($t_p^-(k)=t_b(k)+\tau_3$), in the following manner:

if, in the said list l, there exists at least one programming event {ACR($t_p$), $t_p$} provided at programming time $t_p$ between the present time $t_0$ and the time t, the said value is equal to the programming rate of this event ACR($t_p$) and, if there are a number of them, it is equal to the programming rate of the last of these events, and if, still in this list, there are no programmed events between the present time $t_0$ and t, the said value is equal to the value of the rate controlled at present in the control process.

4. Method according to claim 2, further including:

at the arrival, at the interface unit to which the said source terminal is connected, a backward-resource management cell of reference number (k), and comparing the rate (ER(k)) carried by the said cell with the programmed rate (ACR(l, ($t_p^-(k)$))) at the closest programming time, and then if the said comparison effected at each arrival of a resource management cell indicates that the requested rate ER(k) is greater than the programmed rate at the closest programming time (ACR(l, ($t_p^-(k)$))), deleting, from the said list l, any rate programming event provided at a time greater than or equal to the closest programming time ($t_p^-(k)$) and adding, to the said list l, an event whose controlled rate is equal to the value of the rate ER(k) carried by the said cell and whose programming time is the closest programming time ($t_p^-(k)=t_b(k))+\tau_3$), if the said comparison indicates that the requested rate (ER(k) is equal to the programmed rate ACR(l, ($t_p^-(k)$)) at the closest programming time, deleting, from the list l, any rate programming event whose programming time is greater than the closest programming time ($t_p^-(k)=t_b(k)+\tau_3$), if the said comparison indicates that the requested rate ER(k) is less than the programmed rate ACR(l, ($t_p^-(k)$)), seeking, in the said list l, if it exists, an event whose programming time ($t'_p$) is the smallest programming time in the list greater than the closest time and whose rate is less than or equal to the requested rate ER(K), if this search indicates that this event does not exist, adding, to the list l, an event whose rate is equal to the value of the requested rate ER(k) and whose programming time is the furthest from programming time ($t_p^-(k)=t_b(k)+\tau_2$) and, if this search indicates that this event exists, deleting, from the list l, any programming event whose programming time is greater than or equal to the programming time ($t'_p$) of the said event thus found and adding, to the list l, an event whose rate is equal to the value of the requested rate ER(k) and whose programming time is equal to the programming time of the said found event ($t'_p$), and, changing the control rate of the control process with the rate of the first programmed event {ACR(l), $t_p(1)$} in the list of programming events in response to the programming time $t_p(1)$ of the said first event expiring.

5. Method according to claim 2, further including limiting the number of events stored in the said list 1 to a finite number N of events equal to or greater than two, and, before adding a new event to the said list, making sure that the number of events contained in thy said list is not greater than the said finite number and, in this case, then reducing the number of events contained in the list.

6. Method according to claim 4, wherein the said reduction function includes deleting, from the list 1, any rate programming event whose programming time is greater than or equal to the closest programming time $(t_p^-(k)=t_b(k)+\tau_3)$ and adding to the list 1 an event whose rate is equal to the value of the rate (ER(k)) carried by the said backward-resource management cell and whose programming time is the closest programming time $(t_p^-(k)=t_b(k)+\tau_3)$, in response to the requested rate (ER(k)) carried by the backward-resource management cell (BW-RM) of order k which arrives at time $(t_b(k))$ is equal to the programmed rate $(ACR(l,t_p^-(k)))$ at the closest programming time $(t_p^-(k)=t_b(k)+\tau_3)$.

7. Method according to claim 4, further including responding to an event for a time corresponding to the closest time $(t_p^-(k)=t_b(k)+\tau_3)$ being added to the list by (a) checking, before adding the said event, whether the number of events in the list 1 is equal to the said finite number N and whether the programming time of the last even in the list $(t_p(N))$ is less than or equal to the closest programming time $(t_p^-(k)=t_b(k)+\tau_3)$, (b) defining the programming time of the vent to be added $(t_p(k))$ as being equal to the said programming time of the last event in the list, (c) deleting the last event from the list, (d) adding the said event to be added in place of the last event in the list 1, and (e) otherwise, if the number of events in the list is less than the said finite number N, (i) defining the programming time of the event to be added as being equal to the closest programming time $(t_p^-(k)=t_b(k)+\tau_3)$, and (ii) adding the said event to the list.

8. Method according to claim 4, further including responding to an event for a time corresponding to the furthest away time being added to the list, by checking, before adding the said event, whether the number of events in the list 1 is equal to the said finite number N, and, if such is the case, replacing the programming time $(t_p(k))$ of the event to be added with the programming time of the last event in the list $(t_p(N))$ if the rate of the said event to be added (ER(k)) is greater than or equal to the last programmed rate in the list ER(n), the programming, in place of the penultimate event in the list (of order N−1), an event whose programming time is that of the penultimate event in the list 1 (ACR(N−1), $(t_p(N-1))$), and whose rate is the greater rate of the rates of the last two events in the list 1 (ACR(N−1)=Max (ACR(N−1), ACR(N)), and then adding the event to be added in place of the last event in the list 1.

9. Method according to claim 5, further including responding to an event being added to the list 1, by making sure that the number of events contained in the list 1 does not exceed the said finite number, and if such is the case, seeking in the list 1 two successive events for which the product of the increase or decrease in rate and the measurement of the time interval between their two programming times is a minimum and then substituting for them an event whose rate is the greater of the two rates and whose programming time is the first of the two programming times.

10. User-network interface unit to which there can be connected on the one hand a source terminal and on the other hand a high-speed network, a source terminal adapted to be connected to the said unit periodically for transmitting a so-called resource management call which is adapted to be returned in the form of a so-called backward-resource management cell by a destination terminal with which the source terminal is adapted to be in communication, the said resource management cell comprising a field in which the value of a requested rate is stored, the said interface unit comprising a processor arrangement for performing a control process including verifying the conformity of the transmission rate of the cells sent by the said source terminal with a rate programmed by the processor arrangement performing a programming process, the processor arrangement being arranged to perform the said programming process by determining the time, referred to as the programming time $(t_p(k))$, of the taking into account by the said control process of the rate request (ER(k)) included in the field of the said cell, on the one hand, in response to the arrival of a backward-resource management cell of order k at the said interface unit, the said programming time being equal to the said arrival time $(t_b(k))$ delayed by the minimum forward-backward delay $(\tau_3)$ between the said interface and the said terminal, referred to as the closest programming time, in response to the said taking into account at this closest programming time resulting in an increase in programmed rate and being greater than the closest programming time and less than the said arrival time $(t_b(k))$ delayed by a maximum forward-backward delay $(\tau_2)$, $(t_b(k)+\tau_2)$ being referred to as the furthest away programming time, if its taking into account at the said closest programming time $(t_b(k)+\tau_3)$ had resulted in a decrease in rate, and, on the other hand, by transmitting at the expiry of the programming time $(t_p(k))$, the said value of rate to be controlled $(ACR(t_p(k)))$ to the said control process for controlling the flow sent by the said source terminal.

11. User-network interface unit according to claim 10, wherein the processor arrangement is arranged for keeping a list 1 of programming events, each event being defined by a pair of values, the first of which represents a rate value $ACR(t_p(k))$ and the second of which represents the programming time $t_p(k)$ of the said rate value $ACR(t_p(k))$, and the said list being ordered according to said event programming time.

12. User-network interface unit according to claim 11, wherein the processor arrangement is arranged for ascertaining the programmed rate $(ACR(t_p^-(k)))$ at the arrival time $t_b(k)$ delayed by the minimum forward and backward delay $\tau_3$ $(t_p^-(k)=t_b(k)+\tau_3)$, and which define a function ACR(l,t) making it possible to determine, from events present in the list 1, the value of the programmed rate at any time t in the following manner:

if, in the said list 1, there exists at least one programming event $\{ACR(t_p), t_p\}$ provided at programming time $t_p$ between the present time $t_0$ and the time t, the said value is adapted to be set equal to the programming rate of this event $ACR(t_p)$ and, if there are a number of them, it is adapted to be set equal to the programming rate of the last of these events, and if, still in this list, there are no programmed events between the present time $t_0$ and t, the said value is adapted to be set equal to the value of the rate controlled at present in the control process.

13. User-network interface unit according to claim 11, wherein the processor arrangement is arranged for comparing the rate (ER(k)) carried by the said cell with the programmed rate $(ACR(l, (t_p^-(k)))$ at the closest programming time, in response to the arrival, at the interface unit to which the said source terminal is connected, of a backward-resource management cell of reference number (k), deleting, from the said list l, any rate programming event provided at a time greater than or equal to the closest programming time ($t_p^-(k)$) and adding, to the said list l, an event whose controlled rate is equal to the value of the rate ER(k) carried by the said cell and whose programming time is the closest programming time ($t_p^-(k)=t_b(k)+\tau_3$), the said comparison performed at each arrival of a resource management cell indicating that the requested rate ER(k) is greater than the programmed rate at the closest programming time (ACR(l, ($t_p^-(k)$))), deleting, from the list l, any rate programming event whose programming time is greater than the closest programming time ($t_p^-(k)=t_b(k)+\tau_3$) in response to the said comparison indicating that the requested rate (ER(k) is equal to the programmed rate ACR(l,($t_p^-(k)$)) at the closest programming time, responding to the said comparison indicating that the requested rate ER(k) is less than the programmed rate ACR(l,($t_p^-(k)$)), by seeking, in the said list l, if it exists, an event whose programming time ($t'_p$) is the smallest programming time in the list greater than the closest time and whose rate is less than or equal to the requested rate ER(k), and if this search indicates that this event does not exist, adding, to the list l, an event whose rate is equal to the value of the requested rate ER(k) and whose programming time is the furthest away programming time ($tp^+(k)=t_b(k)+\tau_2$), whereas, if this search indicates that this event exists, by deleting, from the list l, any programming event whose programming time is greater than or equal to the programming time ($t'_p$) of the said event thus found and adding, to the list l, an event whose rate is equal to the value of the requested rate ER(k) and whose programming time is equal to the programming time of the said found event ($t'_p$), changing the control rate of the control process with the rate of the first programmed event {ACR(1), $t_p(1)$} in the list of programming events in response to the programming time $t_p(1)$ of the said first event expiring.

14. User-network interface unit according to claim 11, wherein the processor arrangement is arranged for limiting the number of events stored in the said list l to a finite number N of events equal to or greater than two, and for assuring that the number of events contained in the said list is not greater than the said finite number before adding a new event to the said list, and, for reducing the number of events contained in the list in this case.

15. User-network interface unit according to claim 13, wherein the said reduction function includes deleting, from the list l, any rate programming event whose programming time is greater than or equal to the closest programming time ($t_p^-(k)=t_b(k)+\tau_3$) and adding to the list l an event whose rate is equal to the value of the rate (ER(k)) carried by the said backward-resource management cell and whose programming time is the closest programming time ($t_p^-(k)=t_b(k)+\tau_3$), in response to the requested rate (ER(k)) carried by the backward-resource management cell of order k arriving at time ($t_b(k)$) being equal to the programmed rate (ACR(l,$t_p^-(k)$)) at the closest programming time ($t_p^-(k)=t_b(k)+\tau_3$).

16. User-network interface unit according to claim 13, wherein the processor arrangement is arranged for checking, in response to an event for a time corresponding to the closest time ($t_p(k)=t_b(k)+\tau_3$) being added to the list, and before adding the said event, whether the number of events in the list l is equal to the said finite number N and whether the programming time of the last event in the list l ($t_p(N)$) is less than or equal to the closest programming time ($t_p^-(k)=t_b(k)+\tau_3$), and which then define the programming time of the event to be added ($t_p(k)$) as being equal to the said programming time of the last event in the list, for deleting the last event from the list, and for adding the said event to be added in place of the last event in the list l, and otherwise, if the number of events in the list is less than the said finite number N, defining the programming time of the event to be added as being equal to the closest programming time ($t_p^-(k)=t_b(k)+\tau_3$), and for adding the said event to the list.

17. User-network interface unit according to claim 13, wherein the processor arrangement is arranged for checking, in response to an event for a time corresponding to the furthest away time being added to the list, and before adding the said event, whether the number of events in the list l is equal to the said finite number N, and if such is the case, for replacing the programming time ($t_p(k)$) of the event to be added with the programming time of the last event in the list ($t_{pl}(N)$) if the rate of the said event to be added (ER(k)) is greater than or equal to the last programmed rate in the list ER(N), for programming, in place of the penultimate event in the list (of order N−1), an event whose programming time is that of the penultimate event in the list l (ACR(N−1),($t_{pl}$((N−1)) and whose rate is the greater rate of the rates of the last two events in the list l (ACR(N−1)=Max (ACR(N−1), ACR(N)), and for adding the event to be added in place of the last event in the list l.

18. User network interface unit according to claim 14, wherein the processor arrangement is arranged for making sure, in response to an event being added to the list l, that the numbers of events contained in the list l does not exceed the said finite number, and, if such is the case, for seeking in the list l two successive events for which the product of the increase or decrease in rate and the measurement of the time interval between their two programming times is a minimum and then substituting for them an event whose rate is the greater of the two rates and whose programming time is the first of the two programming times.

* * * * *